(12) United States Patent
Shah et al.

(10) Patent No.: US 7,769,918 B2
(45) Date of Patent: Aug. 3, 2010

(54) APPARATUS AND METHOD FOR HIGH PERFORMANCE VOLATILE DISK DRIVE MEMORY ACCESS USING AN INTEGRATED DMA ENGINE

(75) Inventors: Shrikant M. Shah, Chandler, AZ (US); Chetan J. Rawal, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/360,713

(22) Filed: Jan. 27, 2009

(65) Prior Publication Data

US 2009/0138627 A1 May 28, 2009

Related U.S. Application Data

(63) Continuation of application No. 10/882,073, filed on Jun. 30, 2004, now Pat. No. 7,484,016.

(51) Int. Cl.
*G06F 13/28* (2006.01)

(52) U.S. Cl. ............................. 710/22; 710/24

(58) Field of Classification Search ............ 710/22, 710/24
See application file for complete search history.

(56) References Cited

U.S. PATENT DOCUMENTS

| | | | |
|---|---|---|---|
| 5,241,508 A | 8/1993 | Berenguel et al. | |
| 5,713,044 A | 1/1998 | Gillespie et al. | |
| 6,012,107 A | 1/2000 | Young | |
| 6,493,811 B1 | 12/2002 | Blades et al. | |
| 6,535,518 B1 | 3/2003 | Hu et al. | |
| 6,748,463 B1 | 6/2004 | Tsuboi et al. | |
| 6,889,340 B1 | 5/2005 | Bramley | |
| 7,167,951 B2 | 1/2007 | Blades et al. | |
| 7,484,016 B2 | 1/2009 | Shah et al. | |
| 2002/0069337 A1 | 6/2002 | Hsia et al. | |

(Continued)

FOREIGN PATENT DOCUMENTS

DE 04004796 A1 9/2005

(Continued)

OTHER PUBLICATIONS

Office Action received for Korean Patent Application No. 10-2006-7027705 mailed Mar. 31, 2008, 3 pages and English translation of 6 pages.

(Continued)

*Primary Examiner*—Alford W Kindred
*Assistant Examiner*—David E Martinez
(74) *Attorney, Agent, or Firm*—Derek J. Reynolds (57) ABSTRACT

A method and apparatus for high performance volatile disk drive (VDD) memory access using an integrated direct memory access (DMA) engine. In one embodiment, the method includes the detection of a data access request to VDD memory implemented within volatile system memory. Once a data access request is detected, a VDD driver may issue a DMA data request to perform the data access request from the VDD. Accordingly, in one embodiment, the job of transferring data to/from a VDD memory implemented within an allocated portion of volatile system memory is offloaded to a DMA engine, such as, for example, an integrated DMA engine within a memory controller hub (MCH). Other embodiments are described and claimed.

8 Claims, 6 Drawing Sheets

COMPUTER SYSTEM
100

U.S. PATENT DOCUMENTS

2003/0033497 A1  2/2003  Blades et al.
2003/0188054 A1  10/2003 Yosimoto et al.
2005/0050369 A1  3/2005  Gary

FOREIGN PATENT DOCUMENTS

WO  2006/012196 A2  2/2006

OTHER PUBLICATIONS

International Preliminary Report on Patentability for PCT Application No. PCT/US2005/022226 mailed Jan. 18, 2007, 8 pages.

International Search Report and Written Opinion received for PCT Application No. PCT/US2005/022226 mailed Feb. 8, 2006, 12 pages.

Office Action received for German Patent Application No. 11 2005 001 512.2 mailed Sep. 10, 2008, 3 pages.

Office Action received for U.S. Appl. No. 10/882,073 mailed on Apr. 12, 2007, pp. 15.

Office Action received for U.S. Appl. No. 10/882,073 mailed on Oct. 9, 2007, pp. 16.

Notice of Allowance received for U.S. Appl. No. 10/882,073 mailed on Feb. 28, 2008, pp. 6.

Notice of Allowance received for U.S. Appl. No. 10/882,073 mailed on Sep. 17, 2008, pp. 8.

Office Action received for CN Patent Application No. 200580017641.7 mailed on Apr. 4, 2008, 10 pages and English translation of 15 pages.

Office Action received for TW Patent Application No. 94121186 mailed on Jul. 14, 2006.

Berkley et al. "A Pageable Memory Based Filesystem", A 31, 1998, University of California, http://docs.freebsd.org/44doc/papers/memfs.pdf, pp. 1-5.

Office Action received for Korean Patent Application No. 10-2006-7027705 mailed Oct. 31, 2008, 5 pages and English translation of 15 pages.

APPARATUS AND METHOD FOR HIGH PERFORMANCE VOLATILE DISK DRIVE MEMORY ACCESS USING AN INTEGRATED DMA ENGINE

RELATED APPLICATIONS

This application is related to and claims priority to U.S. patent application Ser. No. 10/882,073 entitled, "APPARATUS AND METHOD FOR HIGH PERFORMANCE VOLATILE DISK DRIVE MEMORY ACCESS USING AN INTEGRATED DMA ENGINE", and filed on Jun. 30, 2004, now U.S. Pat. No. 7,484,016, which is incorporated entirely by reference.

FIELD OF THE INVENTION

One or more embodiments of the invention relate generally to the field of integrated circuit and computer system design. More particularly, one or more of the embodiments of the invention relates to a method and apparatus for high performance volatile disk drive memory access using an integrated direct memory access (DMA) engine.

BACKGROUND OF THE INVENTION

RAMDISK is a memory management technique in which a portion of volatile system memory is used as a mass storage device under program control, referred to herein as a "volatile disk drive (VDD) memory." Operating system (OS) file operations to a RAMDISK are significantly faster than OS operations to traditional hard disks. As a result, a RAMDISK can drastically increase system performance by placing most frequently used programs and files within the portion of system memory allocated to the RAMDISK. Although the RAMDISK does not retain stored information once the system is switched off, the RAMDISK memory management technique is very useful for temporary storage and caching of data, which is stored in a normal OS file format. Typically, RAMDISKS are used in web/file servers to cache frequently used files from a pool of mass media storage.

Conventionally, the driver used to implement RAMDISK is fully implemented in software. As a result, when a program or process wants to read/write a file in a RAMDISK, the RAMDISK driver is invoked. This driver first identifies how the requested file is mapped to system memory locations, which are reserved for the RAMDISK. Once identified, the driver transfers data to/from the RAMDISK's memory to/from the requesting processes' memory. Generally, this is performed with the aid of the CPU where the driver directs the CPU to request data from the RAMDISK portion of system memory.

Unfortunately, the CPU (central processing unit) is required to manage both data transfers and file management functions for the RAMDISK driver. Although the RAMDISK memory management technique is much faster than the use of conventional storage drives, a RAMDISK driver utilizes numerous CPU cycles to transfer data between RAMDISK locations and application locations. Furthermore, implementing a RAMDISK for a memory exceeding 4 gigabytes (GB) (32-bit address), required the RAMDISK driver to use the CPU's page address extension (PAE) mode. Unfortunately, PAE mode, itself, introduces additional performance penalties, not only on the RAMDISK driver, but to all processes running within the system.

BRIEF DESCRIPTION OF THE DRAWINGS

Various embodiments of the present invention are illustrated by way of example, and not by way of limitation, in the figures of the accompanying drawings and in which.

DETAILED DESCRIPTION

A method and apparatus for high performance volatile disk drive (VDD) memory access using an integrated direct memory access (DMA) engine are described. In one embodiment, the method includes the detection of a data access request to VDD memory implemented within volatile system memory. Once a data access request is detected, a VDD driver may issue a DMA data request to perform the data access request from the VDD. Accordingly, in one embodiment, the job of transferring data to/from a VDD memory implemented within an allocated portion of volatile system memory is offloaded to a DMA engine, such as, for example, an integrated DMA engine within a memory controller hub (MCH).

In the following description, numerous specific details such as logic implementations, sizes and names of signals and buses, types and interrelationships of system components, and logic partitioning/integration choices are set forth to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

An example of "software" includes executable code in the form of an application, an applet, a routine or even a series of instructions. In one embodiment, an article of manufacture includes a machine or computer-readable medium having stored thereon instructions to program a computer (or other electronic devices) to perform a process according to one embodiment. The computer or machine readable medium includes, but is not limited to: a programmable electronic circuit, a semiconductor memory device inclusive of volatile memory (e.g., random access memory, etc.) and/or non-volatile memory (e.g., any type of read-only memory "ROM," flash memory), a floppy diskette, an optical disk (e.g., compact disk or digital video disk "DVD"), a hard drive disk, tape, or the like.

System

Figure 1:
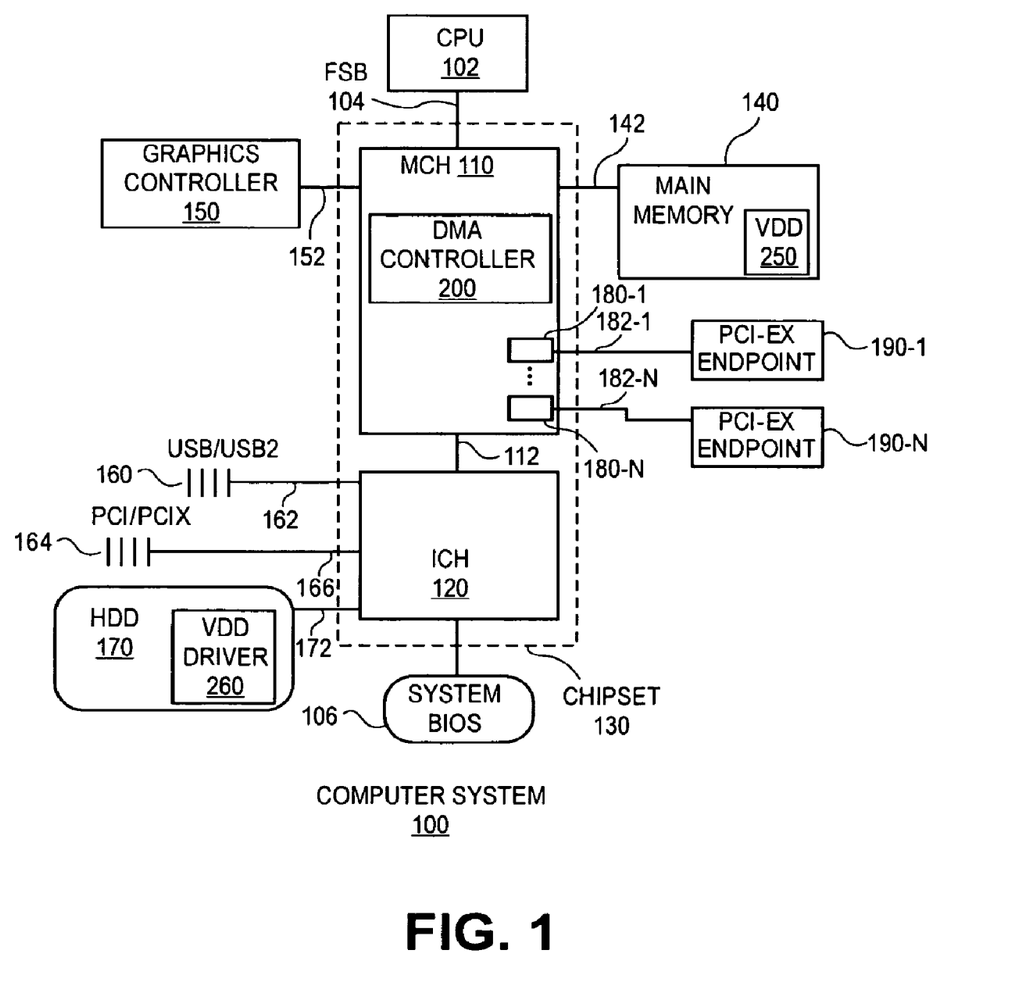
FIG. 1 is a block diagram illustrating a computer system including a DMA control having an integrated DMA engine to provide high performance access to a virtual disk drive (VDD), in accordance with one embodiment.

FIG. 1 is a block diagram illustrating computer system 100 including direct memory access (DMA) controller 200 to provide high performance access to VDD memory 250, in accordance with one embodiment. Representatively, computer system 100 comprises a processor system bus (front side bus (FSB)) 104 for communicating information between processor (CPU) 102 and chipset 130. As described herein, the term "chipset" is used in a manner to collectively describe the various devices coupled to CPU 102 to perform desired system functionality.

Representatively, chipset 130 may include memory controller hub 110 (MCH) coupled to graphics controller 150. In an alternative embodiment, graphics controller 150 is integrated into MCH, such that, in one embodiment, MCH 110 operates as an integrated graphics MCH (GMCH). Representatively, MCH 110 is also coupled to main memory 140 via system memory bus 142. In one embodiment, main memory 140 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed temporary storage of data.

In one embodiment, MCH 110 is integrated within CPU 102 to enable direct connection between CPU 102 and main memory 140. In one embodiment, MCH 110 may include peripheral component interconnect (PCI) PCI-Express (PCI-Ex) root ports 180 (180-1, . . . 180-N) to couple PCI-Ex endpoints 190 (190-1, . . . , 190-N) to MCH 110 via PCI-Ex links 182 (182-1, . . . , 182-N). Representatively, PCI-Ex links 182 may provide a point-to-point link, such as defined by PCI Express Base Specification 1.0a (Errata dated 7 Oct. 2003) to allow bi-directional communication between peripheral endpoint devices 190 (190-1, . . . , 190-N) and MCH 110.

As further illustrated, chipset 130 includes an input/output (I/O) controller hub (ICH) 120. Representatively, ICH 120 may include a universal serial bus (USB) link or interconnect 162 to couple one or more USB slots 160 to ICH 120. In addition, a serial advance technology attachment (SATA) 172 may couple hard disk drive devices (HDD) 170 to ICH 120. In one embodiment, ICH 120 may include legacy PCI/PCIx link 166 to couple one or more PCI/PCIx slots 164 to ICH 120. In one embodiment, system BIOS 106 initializes computer system 100.

Referring again to FIG. 1, in one embodiment, computer system 100 includes VDD driver 260. In operation, VDD driver 260 is responsible for the reservation and allocation of a portion of volatile system memory 140 to operate as VDD memory 250. In one embodiment, the portion of main memory 140 allocated to VDD memory 250 is non-swappable memory that is hidden from a kernel operating system (OS) of computer system 100. As described herein, VDD memory 250 is alternatively referred to as RAMDISK, a memory management technique that allocates a portion of volatile system memory to function as a mass storage device under program control.

Figure 2:
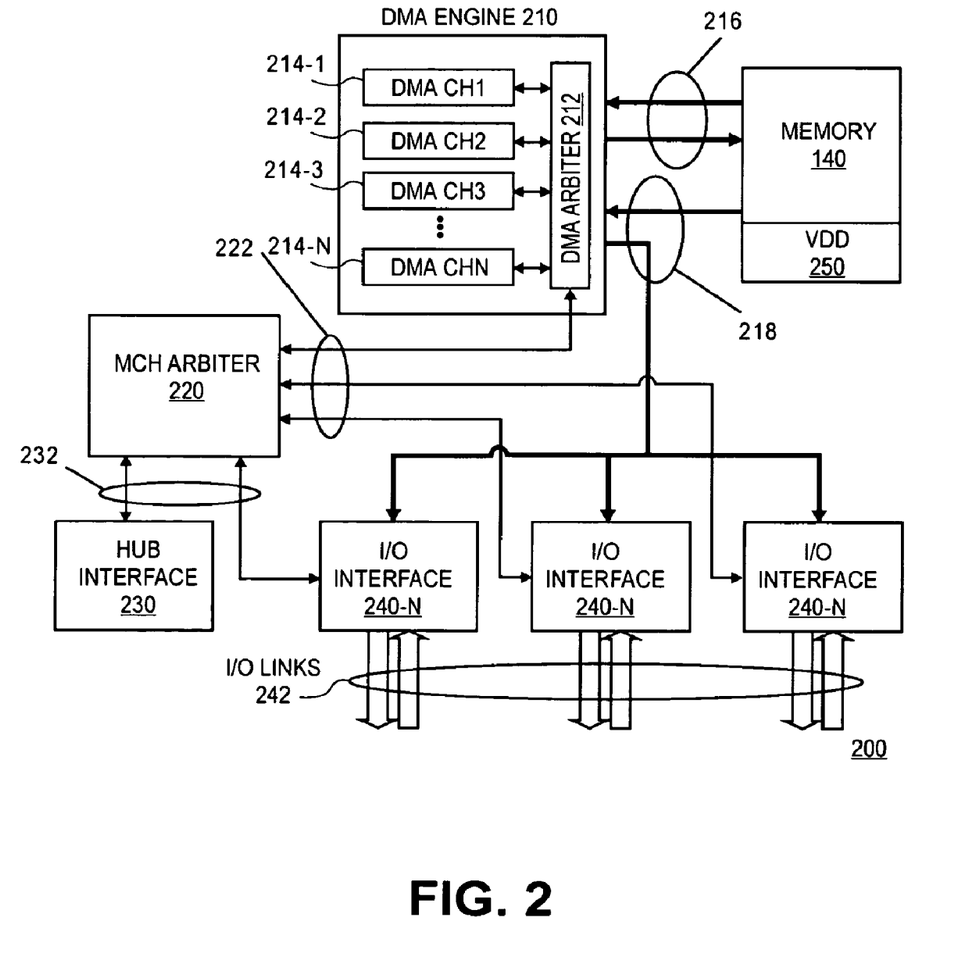
FIG. 2 is a block diagram further illustrating DMA controller of FIG. 1, in accordance with one embodiment.

In one embodiment, VDD driver 260 utilizes DMA controller 200 to perform file operations within VDD memory. Conventionally, main memory access by device drivers (e.g. software associated with peripheral devices coupled to chipset (130)) is performed using programmed transfers in which a CPU issues a bus transaction to initiate either read or write data operation to/from memory for a peripheral device. Conversely, DMA is a capability provided by advanced architectures which allows direct transfer of data between the peripheral devices and main memory, without involving the CPU. As a result, the system's CPU is free from involvement with the data transfer, thus speeding up overall computer operation. In one embodiment, DMA controller 200, as shown in FIG. 2, provides DMA capabilities within computer system 100.

Figure 3:
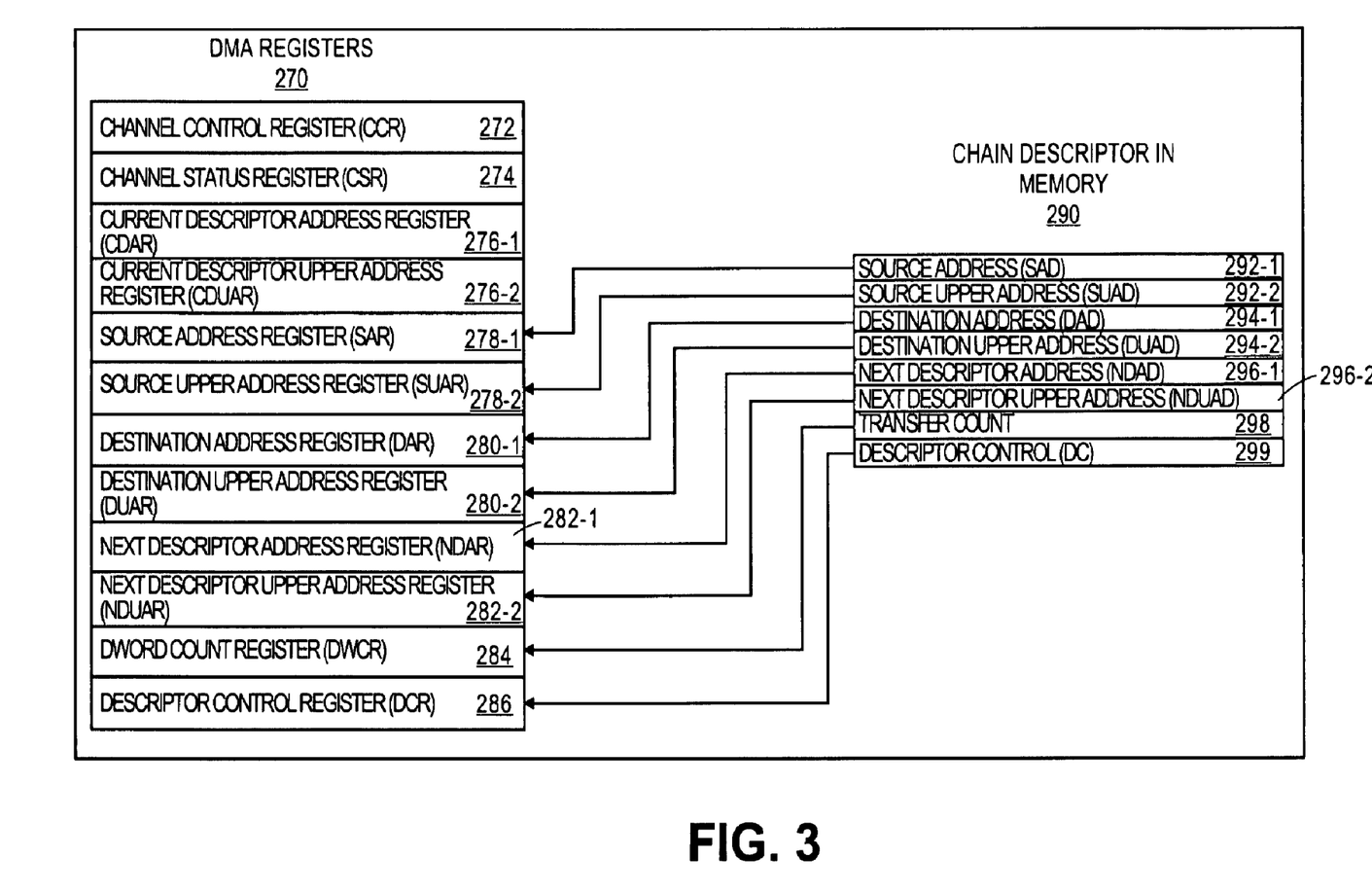
FIG. 3 is a block diagram illustrating a DMA register and chain descriptor mapping, in accordance with one embodiment.
Figure 4:
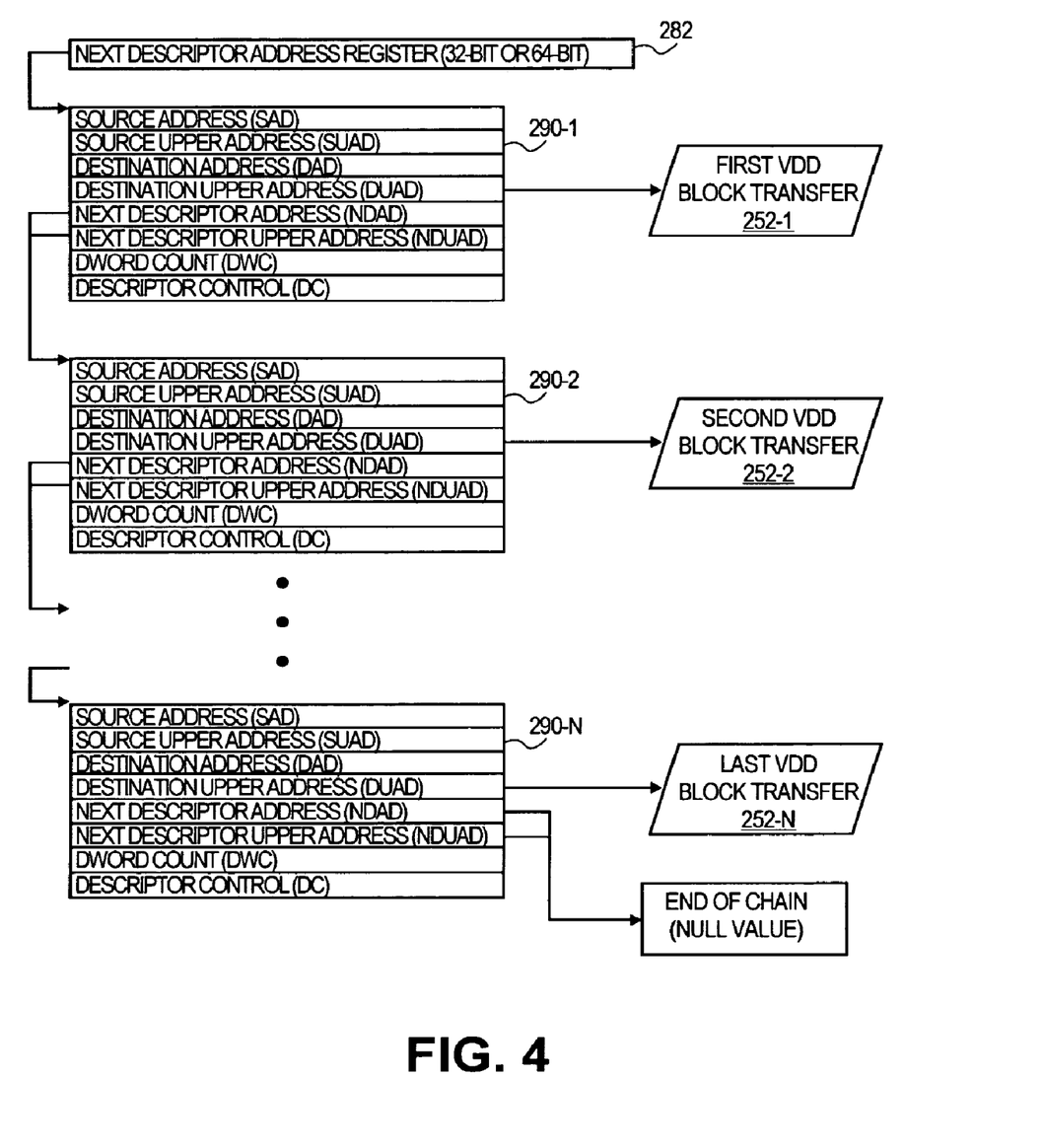
FIG. 4 is a block diagram illustrating a DMA descriptor set linked list set-up to access blocks of data within a virtual disk drive using DMA access, in accordance with one embodiment.

In one embodiment, DMA controller includes integrated DMA engine 210, which is configured to provide a plurality of DMA channels 214 (214-1, . . . 214-N). In one embodiment, DMA controller 200 provides four DMA channels, each of which can be independently used to transfer data within system memory 140 or from system memory 140 to the various peripheral devices coupled to chipset 130. In one embodiment, a DMA channel programming interface, as described in further detail below, is accessible from CPU 102 via a combination of chain descriptors written to main memory 140 and a memory mapped internal register set, as shown in FIGS. 3 and 4.

In one embodiment, arbitration among DMA channels 214 occurs in two stages. Representatively, each DMA channel 214 has an independent bus request/grant pair to the arbiter internal to DMA controller 200 (DMA arbiter 212). As further illustrated, DMA controller 200 has a single request/grant pair to the main arbiter in MCH 110 (MCH arbiter 220). In one embodiment, DMA arbiter 212 uses a strict round-robin policy to grant a DMA channel and a requesting device the access to main memory 140. In one embodiment, DMA arbiter 212 may include an optional high-priority designation for one DMA channel at any given time. Thus, a set of competing DMA channels achieves balanced bandwidth performance during normal operation.

Referring again to FIG. 1, as described herein, each peripheral device or I/O card that resides on a bus coupled to chipset 130 are referred to herein as a "bus agent." Bus agents are generally divided into symmetric agents and priority agents, such that priority agents are awarded ownership when competing with symmetric agents for bus ownership. Such arbitration is required since bus agents are generally not allowed to simultaneously drive the bus to issue transactions. Device drivers associated with bus agents of computer system 100 may issue transaction request 232 to MCH. Depending on the priority policy, MCH arbiter 220 arbitrates for a DMA channel 214 to issue a DMA transfer request, as shown in FIG. 2.

As described herein, the term "transaction" is defined as bus activity related to a single bus access request. Generally, a transaction may begin with bus arbitration and the assertion of a signal to propagate a transaction address. A transaction, as defined by the Intel® architecture (IA) specification, may include several phases, each phase using a specific set of signals to communicate a particular type of information. Phases may include at least an arbitration phase (for bus ownership), a request phase, a response phase and a data transfer phase.

Implementing DMA access within a computer system, such as computer system 100, requires the designation of devices with DMA access as bus masters. A bus master is a program either in a microprocessor or in a separate I/O controller ("device driver") that directs traffic on the system bus or input/output (I/O) paths. In operation, bus master device drivers make a request to the OS for an assignment of a portion of main memory 140 which is designated or enabled for DMA to issue DMA data requests.

Referring again to FIG. 1, in one embodiment, VDD driver 260 controls one or more DMA channels that are awarded bus master status, which enables VDD driver 260 to issue DMA access requests to DMA controller 200. In operation, after the arbitration with DMA arbiter 212 and subsequently with MCH arbiter 220, a DMA channel 214 is awarded access to issue a DMA access request to VDD memory 250. Accordingly, in one embodiment, when an application or process requests performance of a file operation, such as read/write access to a file stored within VDD memory 250, the OS may pass the call to VDD driver 260. To direct DMA engine 210 to perform the requested file operation, in one embodiment, VDD driver 260 programs a chain descriptor, for example, as illustrated with reference to FIG. 3.

In one embodiment, DMA controller 200 uses memory mapped configuration registers for all per channel register sets. In one embodiment, the memory mapped register space associated with DMA controller 200 is identified by a 32-bit memory-base address register (BAR), which is used by, for example, VDD driver 260 to access DMA configuration registers 270 required to program a DMA channel to initiate a DMA transfer. In one embodiment, as illustrated in FIG. 3, each DMA channel has twelve 32-bit memory mapped registers for its independent operation.

In one embodiment, eight of DMA registers 270 are automatically loaded from their corresponding fields in a chain descriptor, such as chain descriptor 290, when a new descriptor is fetched from local memory during normal operation. The format of the corresponding descriptor fields in memory 290 is identical to the format defined for the DMA channel specific registers 270. When the DMA controller 200 is in normal mode, as defined by DMA mode bit of DMA mode control registers, read/write access is available to the channel control 272, channel status 274, next descriptor address 282-1 and next descriptor upper address 282-2 registers. The remaining registers are read only and are automatically loaded with new values defined by chain descriptor 290 whenever the DMA channel reads a chain descriptor from local system memory.

TABLE 1

| BIT FIELD | DESCRIPTION |
| --- | --- |
| 31:8 | Reserved |
| 7:6 | Reserved |
| 5:4 | Reserved |
| 3 | Channel Resume. When set, causes the channel to resume chaining by rereading the current descriptor set located in local system memory at address in the Current Descriptor Address Registers when the channel is idle (channel active bit in CSR is active) or when the channel completes a DMA transfer for which the Next Descriptor Address is null. This bit is cleared by the hardware when: The channel completes a DMA transfer and the Next Address Register is not zero. In this case the channel proceeds to the next descriptor set in the linked list. The channel is idle or the channel completes execution of the current descriptor set and the Next Descriptor Address Register is zero. In this case the channel simply clears the "channel resume" it, and remains idle. Once set, software cannot clear this bit. Hardware prevents this bit from being set when either the stopped or aborted bits is set in the CSR. Software must clear the CSR stopped and aborted bit before attempting to resume the current descriptor set. If the CSR end of chain bit was set, the DMA channel clears the end of chain bit when the current descriptor set is resumed. |
| 2 | Stop DMA. When set, causes the current DMA transfer to stop. This causes the channel not to request the bus on the source side. Any data in the queue is emptied to the destination side and all the relevant bits in the CCR (all bits 3:0) and CSR (Channel Active bit) are cleared. Once set, this bit cannot be cleared by the software. The application software must be very careful in setting this bit as any DMA once stopped cannot be restarted from that point. This bit has higher priority over the Suspend DMA bit. This bit is cleared by hardware after the Channel Active bit is cleared and the DMA stopped bit is set. |
| 1 | Suspend DMA. When set, allows the current DMA descriptor set to finish, but does suspend channel chaining. The channel continues to request the bus on the source side for the current descriptor. When the data in the queue for this descriptor set is emptied to the destination side, the DMA Suspended bit in CSR is set. Clearing this bit and setting "Channel Resume' will restart the DMA transfer using the descriptor set indicated by the Next Descriptor Address Register, and clears the DMA Suspended bit in CSR. This bit has no effect on Channel Active bit. |
| 0 | Start DMA. When set, the channel is enabled for DMA transfer. Once set, this bit cannot be cleared by software. This bit is cleared by hardware when the DMA transfer is over or the DMA is stopped by software or the DMA transfer encounters an unrecoverable error. |

TABLE 1-continued

| BIT FIELD | DESCRIPTION |
|---|---|
| | Hardware prevents this bit from being set when the stopped or aborted bit is set in the CSR. The DMA channel must be idle and software must clear the CSR before starting the DMA channel with a new descriptor set. |

Referring again to FIG. 3, memory mapped DMA registers 270 include channel control register (CCR) 272, as further illustrated with reference to Table 1 provided above. In one embodiment, CCR 272 specifies the overall operating environment for the DMA channel. In one embodiment, a device driver initializes CCR 207 after initializing chain descriptors in system memory and updating the next address registers 282 (282-1, 282-2) with the location of the first DMA chain descriptor in memory. In one embodiment, CCR 272 may be written when the DMA channel is active to modify DMA channel operation (e.g., stop, suspend, etc.).

TABLE 2

| BIT FIELD | DESCRIPTION |
|---|---|
| 31:7 | Reserved |
| 6 | Reserved |
| 5 | Channel Active. When set, indicates the channel is in use and actively performing DMA data transfers. When clear, indicates the channel is inactive and available to be configured for DMA transfer by application software. The channel active flag is set by hardware when software initiates a DMA transfer by setting the Start DMA bit of CCR and the DMA channel in response loads the descriptor set from the local system memory. |
| 4 | DMA Aborted (DABRT). When set, indicates the current DMA transfer for this channel encountered an unrecoverable error. If the DMA Aborted Interrupt Enable bit of DCR is set, this flags an interrupt to the processor interface. Application software can use this bit for polling if interrupt is not enabled. Details are in the DMA FERR/NERR registers. |
| 3 | DMA Stopped (DSTP). When set, indicates that the current DMA transfer for this channel is stopped by application software by setting the Stop DMA bit in CCR. If the DMA Stopped Interrupt Enable bit of DCR is set, this flags an interrupt to the processor interface. Application software can use this bit for polling if interrupt is not enabled. |
| 2 | DMA Suspended (DSUS). When set, indicates this channel is suspended as requested by the application software by setting the Suspend DMA bit in CCR. If the DMA Suspended Interrupt Enable bit of DCR is set, this flags an interrupt to the processor interface. Application software can use this bit for polling if interrupt is not enabled. |
| 1 | End of Transfer (EOT). When set, indicates the channel has successfully completed an error-free DMA transfer of at least one descriptor. If the End of Transfer Interrupt Enable bit of DCR is set, this flags an interrupt to the processor interface. Application software can use this bit for polling if interrupt is not enabled. |
| 0 | End of Chain (EOC). When set, indicates the channel has successfully completed an error-free DMA transfer of the last descriptor set in the linked list. If the End of Chain Interrupt Enable bit of DCR is set, this flags an interrupt to the processor interface. Application software can use this bit for polling if interrupt is not enabled. |

In one embodiment, channel status register (CSR) 274 contains flags to indicate the DMA channel status. In one embodiment, register 274 is read by VDD driver 260 to get the current DMA channel status and to determine the source of interrupts. As illustrated in Table 2, the various flags included within CSR 274 include channel active, which indicates that the channel is in use; DMA aborted (DMABRT), which indicates an aborted DMA transfer. Likewise, CSR 274 flags also include DMA stop (DSTP) bit, which when set, indicates the current DMA transfer for this channel is stopped.

In one embodiment, setting DMA suspended (DSUS) bit indicates a suspended DMA request, whereas end of transfer (EOT) indicates that a channel has successfully completed DMA for at least one descriptor; and end-of-chain (EOC) flag indicates an error-free DMA transfer for all descriptors including the last one. As described herein, the terms "assert," "asserting," "asserted," "set," "setting," "deasserted," "deassert," "deasserting" or the like terms may refer to data signals, which are either active low or active high signals. Therefore such terms, when associated with a signal, are interchangeably used to require or imply either active high or active low signals.

Current descriptor address register (CDAR) 276 (276-1, 276-2) contain the lower and upper bits of the address of the current chain descriptor in local system memory. In one embodiment, CDAR 276 is cleared to zero on power on or system reset and is loaded automatically with the value from the next descriptor address register (NDAR) when a new block transfer is initiated. In one embodiment, CDAR 276 is read only during normal operation and may be polled by software to monitor the progress of the DMA channel as it traverses the DMA descriptor chain. The remaining DMA registers 270 correspond to DMA chain descriptors 290, which may be programmed by VDD driver 260 before initiating a DMA transfer.

In one embodiment, VDD driver 260 initializes a DMA channel by constructing one or more chain descriptors in local system memory. As illustrated in FIGS. 3 and 4, the descriptor may include a source address 292, which indicates the initial location of DMA data, a destination address 294 illustrating where the DMA request is to move or transfer the DMA data, transfer count 298 indicating number of bytes to be transferred, as well as a next descriptor address 296 indicating the address of the next descriptor in the descriptor chain. The next descriptor address 296 of the last descriptor of the descriptor chain is set to zero.

In operation, VDD driver 260 receives file operation requests from the OS following issuance of the file operation request by an application or process. Based on such request, VDD driver 260 programs the various components of chain descriptor 290, including a source address 292 and destination address 294, as well as the transfer count. In one embodiment, transfer count 298 is provided in units of a double word (Dword) and may be referred to as Dword count 298. Once the chain descriptor is programmed, VDD driver 260 updates next descriptor address register 286 (NDAR) of DMA registers 270.

In one embodiment, NDAR 286 is used by DMA controller 200 to locate the chain descriptor programmed by VDD driver 260. Accordingly, once NDAR 286 is populated with the address of the first chain descriptor 290 in memory, VDD driver 260 may set a DMA start bit within channel control registers 272 (see Table 1). As illustrated in FIG. 4, VDD driver 260 may set-up a chain of block transfers to VDD memory 250; however, if the file request from the application or process is limited to a single block transfer from VDD 250, VDD driver 260 will set next descriptor address fields of DMA chain descriptor 290-1 to a null (zero) value.

Referring again to FIG. 3, source address register (SAR) 278 and destination address register (DAR) 280 fields of DMA registers 270 also include upper address register fields (278-2 and 280-2). In one embodiment, the upper address register fields (278-2 and 280-2) are provided to enable to a 36-bit or 64-gigabyte addressing range for DMA access requests. Accordingly, in contrast to conventional access to a VDD memory 250 or RAMDISK set up within volatile system memory 140, DMA controller 200 enables addressing outside the 32-bit address limit for data transfers, which otherwise requires use of a page address extension (PAE) capability of CPU 102 for access requests to VDD memory 250 that exceed the four-gigabyte (GB) boundary.

Figure 5:
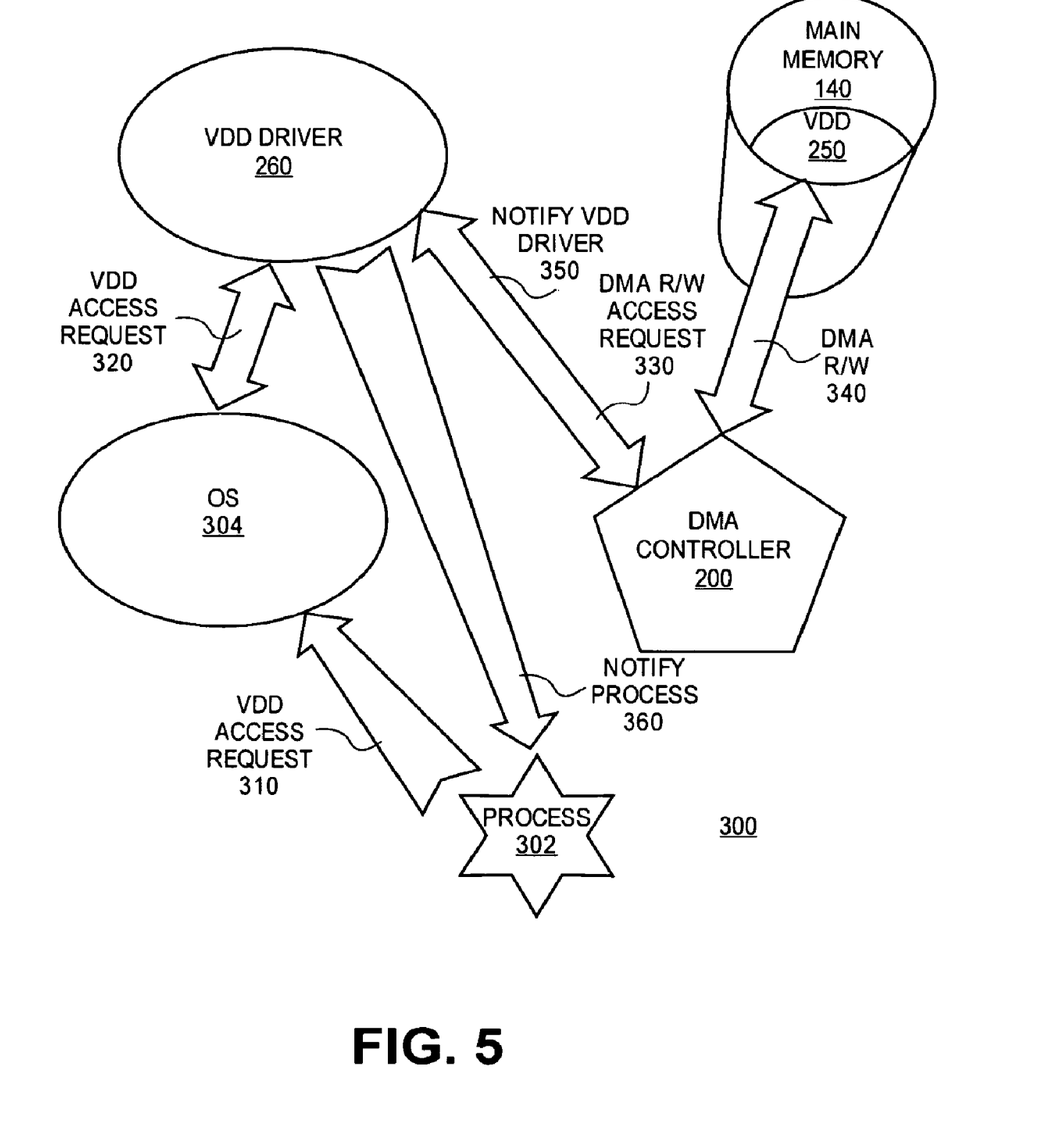
FIG. 5 is a block diagram illustrating the detection of a VDD access request and subsequent performance of the VDD access request via direct memory access using the DMA controller of FIG. 1, in accordance with one embodiment.

FIG. 5 illustrates an overview of a method 300 for performing a file operation within VDD memory 250 utilizing integrated DMA engine 210 within DMA controller 200, according to one embodiment. Representatively, process 302, such as an application or running program, may require a file operation, or read/write request, to a file contained within VDD memory 250. At transition 310, process 302 issues a VDD access request. When such access is detected by, for example, OS 304, OS 304 passes the call to VDD driver 260 by passing VDD access request to the VDD driver 260 at transition 320.

In one embodiment, VDD driver 260 identifies a file to which the file operation or read/write request is detected. Once detected, VDD driver 260 converts the file name and an offset to which the access request is directed in the file into a physical address within main memory 140. In one embodiment, the conversion is performed according to the physical address range within main memory 140 that is mapped to VDD memory 250. Once the physical address for the file is determined, VDD driver 260 may program a DMA source and destination addresses, as well as a transfer length, by populating a DMA chain descriptor, for example, as illustrated with reference to FIGS. 3 and 4, to issue a DMA read/write (R/W) access request to DMA controller 200, as indicated by transition 330.

As illustrated with reference to FIG. 4, if multiple blocks of data are involved with the file operation or data access request to VDD 250, VDD driver 260 may program for a chain of VDD block transfers. Subsequently, NDAR 282 of DMA controller 200 is populated such that DMA controller 200 may load the chain of descriptors within DMA registers 270, as illustrated in FIG. 3. The DMA controller 200 performs such action once a DMA start bit of channel control register 272 is set by, for example, VDD driver 260. Subsequently, DMA engine 210, as illustrated in FIG. 2, performs the data access request or file operation according to the at least one DMA chain descriptor program by VDD memory 250 by performing a DMA R/W, as indicated at transition 340.

In one embodiment, once DMA engine 210 has completed the transfer, at transition 350, the DMA engine may issue an interrupt to the VDD driver 260 to notify the VDD driver that the file operation is complete and data is transferred to/from VDD 250 to memory allocated to process 302. Representatively, once VDD driver 260 receives notification at transition 350 that the DMA transfer is complete, VDD driver 260 may notify process 302 that the requested file operation or read/write access request to/from VDD memory 250 is complete. In one embodiment, VDD driver 260 notifies process 302 of the completed DMA transfer at transition 360.

Accordingly, in one embodiment, generation of VDD driver 260 offloads the operation of accessing file data within VDD memory 250 to an integrated DMA engine of a DMA controller, for example, as illustrated with reference to FIGS. 1 and 2. Accordingly, by offloading the data transfer job from CPU 102 to DMA controller 200, overall system performance is improved, allowing CPU 102 to avoid performing the conventional data transfer to perform the file operation to VDD memory 250. Furthermore, unlike conventional RAMDISK drivers, which require the use of the CPU's page address extension (PAE) mode to address ranges beyond the 32-bit addressing boundary, the offloading of VDD memory data transfer to DMA engine 210 avoids the performance penalties generally incurred by use of the PAE mode not only to VDD driver 260, but also to all processes on the system.

Figure 6:
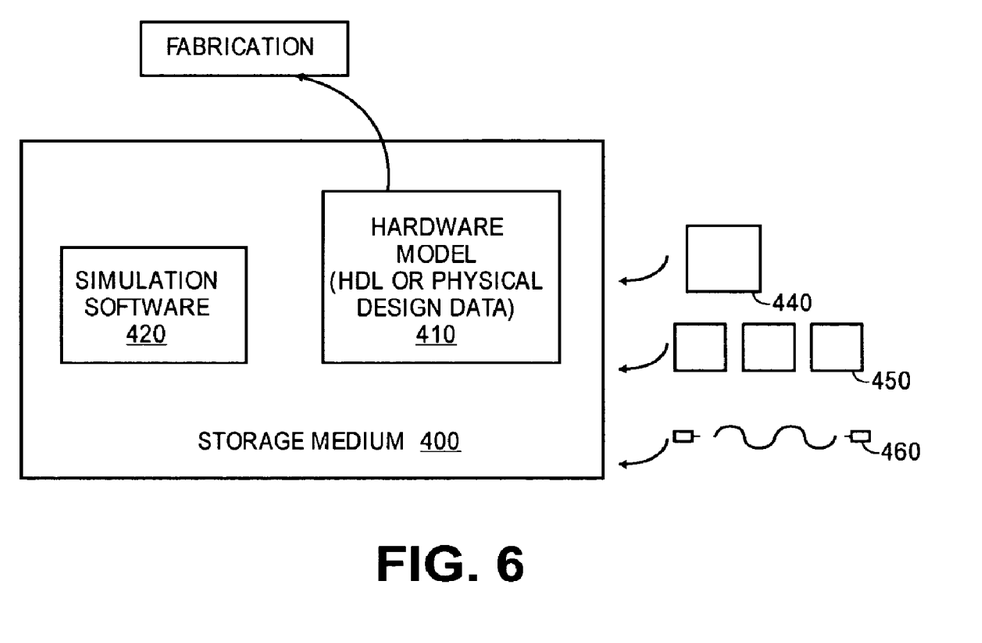
FIG. 6 is a block diagram illustrating various design representations or formats for simulation, emulation and fabrication of a design using the disclosed techniques.

FIG. 6 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 410 may be stored in a storage medium 400, such as a computer memory, so that the model may be simulated using simulation software 420 that applies a particular test suite 430 to the hardware model to determine if it indeed functions as intended. In some embodiments, the simulation software is not recorded, captured or contained in the medium.

In any representation of the design, the data may be stored in any form of a machine readable medium. An optical or electrical wave 460 modulated or otherwise generated to transport such information, a memory 450 or a magnetic or optical storage 440, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

It will be appreciated that, for other embodiments, a different system configuration may be used. For example, while the system 100 includes a single CPU 102 for other embodiments, a multiprocessor system (where one or more processors may be similar in configuration and operation to the CPU 102 described above) may benefit from the integrated DMA memory controller access to VDD memory of various embodiments. Further different type of system or different type of computer system such as, for example, a server, a workstation, a desktop computer system, a gaming system, an embedded computer system, a blade server, etc., may be used for other embodiments.

Having disclosed embodiments and the best mode, modifications and variations may be made to the disclosed embodiments while remaining within the scope of the embodiments of the invention as defined by the following claims.

What is claimed is:

1. An apparatus, comprising:
   a system memory, the system memory including a volatile disk drive (VDD) memory;
   a mass storage device to store a VDD driver;
   a direct memory access(DMA) controller; and
   logic to detect a data access request to the VDD memory;
   wherein the VDD driver is operable to
      issue a direct memory access (DMA) data request to the DMA controller to perform the data access request from the VDD memory;
      populate at least one DMA chain descriptor according to the data access request; and
      issue a DMA start command to perform the data access request to a file within the VDD memory; and
   wherein the DMA controller further comprises a DMA engine, the DMA engine including:
      a next descriptor address register; and
      a start DMA bit.

2. The apparatus of claim 1, wherein the VDD driver is further operable to:
   identify the file within the VDD memory to which the data access request is directed;
   calculate a physical start address of the file within the system memory;
   compute a DMA source address according to an offset of the data access request within the file stored within the VDD memory; and
   compute a DMA destination address according to the data access request.

3. The apparatus of claim 1, wherein the VDD driver is further operable to:
   receive a read/write access to a file stored within the VDD memory; and
   detect a process initiating the read/write access request to the file stored within the VDD memory.

4. The apparatus of claim 1, wherein the VDD driver is further operable to:
   reserve a portion of the volatile system memory; and
   allocate, during initialization, the reserved portion of system memory to operate as the VDD memory.

5. The apparatus of claim 1, wherein the logic is further operable to receive, from an operating system, a read/write access request issued by a process to a file stored within the VDD memory.

6. The apparatus of claim 1,
   wherein the VDD driver is further operable to
      update the DMA engine next descriptor address register with an address of the at least one DMA chain descriptor within local system memory; and
      setting a DMA engine start DMA bit to cause the DMA engine to perform the data access request to the file stored within the VDD memory.

7. The apparatus of claim 6, wherein the DMA engine is further operable to:
   fetch a DMA chain descriptor at an address contained within the next descriptor address register;
   perform a DMA transfer, according to the fetched DMA chain descriptor, to transfer DMA data to a file stored within the VDD memory according to the data access request; and
   issue an interrupt to the VDD driver in response to the DMA transfer completing.

8. The apparatus of claim 7, wherein the VDD driver is further operable to:
   receive the interrupt from the DMA engine; and
   inform a process that issued the data access request that the file operation is complete.

* * * * *